US012670429B2

(12) United States Patent
Eddins et al.

(10) Patent No.: US 12,670,429 B2
(45) Date of Patent: Jun. 30, 2026

(54) REDUCING THE SAMPLING COST OF QUANTUM ERROR MITIGATION BY COMPUTING TIME-EVOLVED COMMUTATORS

(71) Applicant: International Business Machines Corporation, Armonk, NY (US)

(72) Inventors: Andrew Eddins, San Jose, CA (US); Patrick Julian Tassilo Rall, Boston, MA (US); Minh Tran, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 18/534,959

(22) Filed: Dec. 11, 2023

(65) Prior Publication Data

US 2025/0190836 A1 Jun. 12, 2025

(51) Int. Cl.
*G06N 10/70* (2022.01)

(52) U.S. Cl.
CPC .................................... *G06N 10/70* (2022.01)

(58) Field of Classification Search
CPC ...................................................... G06N 10/70
See application file for complete search history.

(56) References Cited

U.S. PATENT DOCUMENTS

| | | | |
|---|---|---|---|
| 2012/0263119 A1* | 10/2012 | Monogioudis ........ | H04W 28/24 |
| | | | 370/329 |
| 2021/0019564 A1* | 1/2021 | Zhou ........................ | G06F 18/24 |
| 2021/0099201 A1 | 4/2021 | Winick et al. | |
| 2022/0414519 A1* | 12/2022 | McClean ............... | G06N 10/20 |

FOREIGN PATENT DOCUMENTS

CN 113065659 B 1/2022

OTHER PUBLICATIONS

Temme et al., "Error Mitigation for Short-Depth Quantum Circuits," arXiv:1612.02058v3, Nov. 6, 2017, pp. 1-15.
Van Den Berg et al., "Probabilistic Error Cancellation with Sparse Pauli-Lindblad Models on Noisy Quantum Processors," arXiv:2201.09866v2, Jun. 23, 2022, pp. 1-29.

(Continued)

*Primary Examiner* — Guerrier Merant
*Assistant Examiner* — Victor Perry
(74) *Attorney, Agent, or Firm* — Samuel A. Waldbaum

(57) ABSTRACT

A method, system, and computer program product for reducing the sampling cost of quantum error mitigation. A map of root errors ("shaded light cone"), where each root error includes a likelihood an error impacts a state of a target qubit(s), is generated by computing time-evolved commutators of local errors and an observable (e.g., energy) or an initial state on a portion of the quantum circuit. A prioritization scheme is then applied after using the generated map to tighten an upper bound on a systematic error of a quantum error mitigation computation to reduce an error rate of the state of a target qubit(s). For example, error channels defined by a noise model may be prioritized using the upper bound. Anti-noise may then be applied to mitigate the error channels in order of priority. In this manner, there is a reduction in overall execution time for quantum error mitigation techniques.

20 Claims, 9 Drawing Sheets

GENERATING ENGINE ⌐201

PRIORITIZATION ENGINE ⌐202

MITIGATION ENGINE ⌐203

(56)           References Cited

OTHER PUBLICATIONS

Tran et al., "Locality and Error Mitigation of Quantum Circuits," arXiv:2303.06496v1, Mar. 11, 2023, pp. 1-9.

Niroula et al., "Error Mitigation Thresholds in Noisy Quantum Circuits," arXiv.2302.04278v1, Feb. 8, 2023, pp. 1-10.

Jnane et al., "Quantum Error Mitigated Classical Shadows," arXiv:2305.04956v1, May 8, 2023, pp. 1-19.

Takagi et al., "Fundamental Limits of Quantum Error Mitigation," npj Quantum Information, vol. 8, No. 1, 2022, pp. 1-11.

* cited by examiner

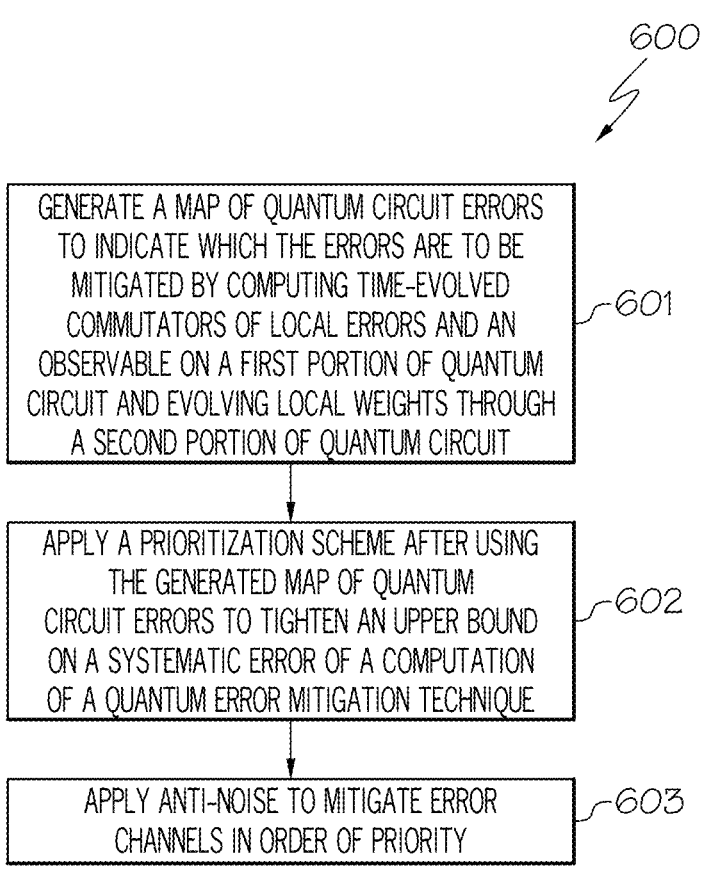

600

GENERATE A MAP OF QUANTUM CIRCUIT ERRORS
TO INDICATE WHICH THE ERRORS ARE TO BE
MITIGATED BY COMPUTING TIME-EVOLVED
COMMUTATORS OF LOCAL ERRORS AND AN
OBSERVABLE ON A FIRST PORTION OF QUANTUM
CIRCUIT AND EVOLVING LOCAL WEIGHTS THROUGH
A SECOND PORTION OF QUANTUM CIRCUIT    601

APPLY A PRIORITIZATION SCHEME AFTER USING
THE GENERATED MAP OF QUANTUM
CIRCUIT ERRORS TO TIGHTEN AN UPPER BOUND
ON A SYSTEMATIC ERROR OF A COMPUTATION
OF A QUANTUM ERROR MITIGATION TECHNIQUE    602

APPLY ANTI-NOISE TO MITIGATE ERROR
CHANNELS IN ORDER OF PRIORITY    603

IDENTIFY AN INTERMEDIATE POINT
BETWEEN THE OBSERVABLE AND THE ERROR          801

EVOLVE ERROR FORWARDS TO THE
INTERMEDIATE POINT          802

EVOLVE OBSERVABLE BACKWARDS TO THE
INTERMEDIATE POINT          803

COMPUTE THE SPECTRAL NORM OF THE
COMMUTATION OF THE EVOLVED
OBSERVABLE AND THE EVOLVED ERROR          804

900

OOBTAIN BOUNDS ON THE LOCAL WEIGHTS
OF THE OBSERVABLE — 901

EVOLVE THE BOUNDS ON THE LOCAL
WEIGHTS BACKWARDS — 902

COMPUTE THE BOUND ON THE SPECTRAL
NORM OF THE COMMUTATOR OF THE
EVOLVED OBSERVABLE AND THE EVOLVED
ERROR USING THE EVOLVED LOCAL WEIGHTS — 903

REDUCING THE SAMPLING COST OF QUANTUM ERROR MITIGATION BY COMPUTING TIME-EVOLVED COMMUTATORS

TECHNICAL FIELD

The present disclosure relates generally to quantum error mitigation, and more particularly to reducing the sampling cost of quantum error mitigation by computing time-evolved commutators.

BACKGROUND

Quantum computing is a rapidly-emerging technology that harnesses the laws of quantum mechanics to solve problems too complex for classical computers. A quantum computer is a computer that exploits quantum mechanical phenomena. At small scales, physical matter exhibits properties of superposition and entanglement, and quantum computing leverages this behavior using specialized hardware that supports the preparation and manipulation of quantum states. Classical physics cannot explain the operation of these quantum devices, and a scalable quantum computer could perform some calculations exponentially faster than any modern "classical" computer.

Quantum hardware, however, is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes.

Techniques, such as quantum error mitigation techniques, have been developed to reduce (mitigate) the errors that occur in quantum computing algorithms. Such techniques involve running additional modified target circuits (target circuit is the quantum circuit executed on the quantum computer implementing the desired quantum algorithm). As a result, the use of quantum error mitigation techniques generally results in longer execution times. That is, such quantum error mitigation methods reduce the effect of hardware errors at a "sampling cost," where the "sampling cost" refers to running the quantum circuit multiple times.

An example of a quantum error mitigation technique is the probabilistic error cancellation technique. Probabilistic error cancellation (PEC) is an error-mitigation technique that obtains accurate, bias-free estimates of observable expectation values. An observable refers to a property of the system that can be measured, such as position, momentum, angular momentum, energy, a binary value of a qubit, etc. An expectation value refers to the statistical average over classical and quantum randomness. The PEC procedure learns the noise associated with ideal unitary gates and implements a noise inversion ("antinoise") to cancel the noise via probabilistically sampling Pauli operators from an appropriately constructed inverse distribution and inserting them into a modified quantum circuit.

The sampling cost from using PEC grows exponentially with the amount of noise that must be cancelled. As a result, for existing quantum hardware, the use of PEC is limited to relatively small computations. Other quantum error mitigation techniques exist with lower sampling costs; however, such techniques tend to be less accurate than PEC.

Unfortunately, there is not currently an effective means for reducing the sampling cost of PEC while maintaining rigorous accuracy bounds so that PEC can be applied to a wider range of quantum computations, including larger computations.

SUMMARY

In one embodiment of the present disclosure, a method for reducing the sampling cost of quantum error mitigation comprises generating a map of root errors, where each of the root errors comprises a likelihood an error impacts a state of at least one target qubit. The method further comprises applying a prioritization scheme after using the map to tighten an upper bound on a systematic error of a computation of a quantum error mitigation technique to reduce an error rate of the state of the at least one target qubit.

Additionally, in one embodiment of the present disclosure, the method further comprises prioritizing error channels defined by a noise model using the upper bound. The method additionally comprises applying anti-noise to mitigate the error channels in order of priority.

Furthermore, in one embodiment of the present disclosure, the method additionally comprises evolving an observable backwards. The method further comprises evolving an error forwards.

Additionally, in one embodiment of the present disclosure, the method further comprises computing a spectral norm of a commutator of the evolved observable and the evolved error.

Furthermore, in one embodiment of the present disclosure, the method additionally comprises evolving local weights backwards. The method further comprises computing a bound on a spectral norm of a commutator of an evolved observable using the evolved local weights.

Additionally, in one embodiment of the present disclosure, the method further comprises selecting which qubits to perform the quantum error mitigation technique based on the map.

Furthermore, in one embodiment of the present disclosure, the quantum error mitigation technique comprises probabilistic error cancellation.

Other forms of the embodiments of the method described above are in a system and in a computer program product.

Accordingly, embodiments of the present disclosure reduce the sampling cost of quantum error mitigation techniques, such as probabilistic error cancellation, by a prioritization scheme which determines which errors can be ignored instead of cancelled thereby reducing the sampling cost of computations. Accordingly, there is a reduction in overall execution time for quantum error mitigation techniques, such as probabilistic error cancellation, thereby enabling such techniques to be applied for a wider range of quantum computations, including larger calculations.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 6 is a flowchart of a method for reducing the sampling cost of quantum error mitigation in accordance with an embodiment of the present disclosure;

DETAILED DESCRIPTION

Figure 1:
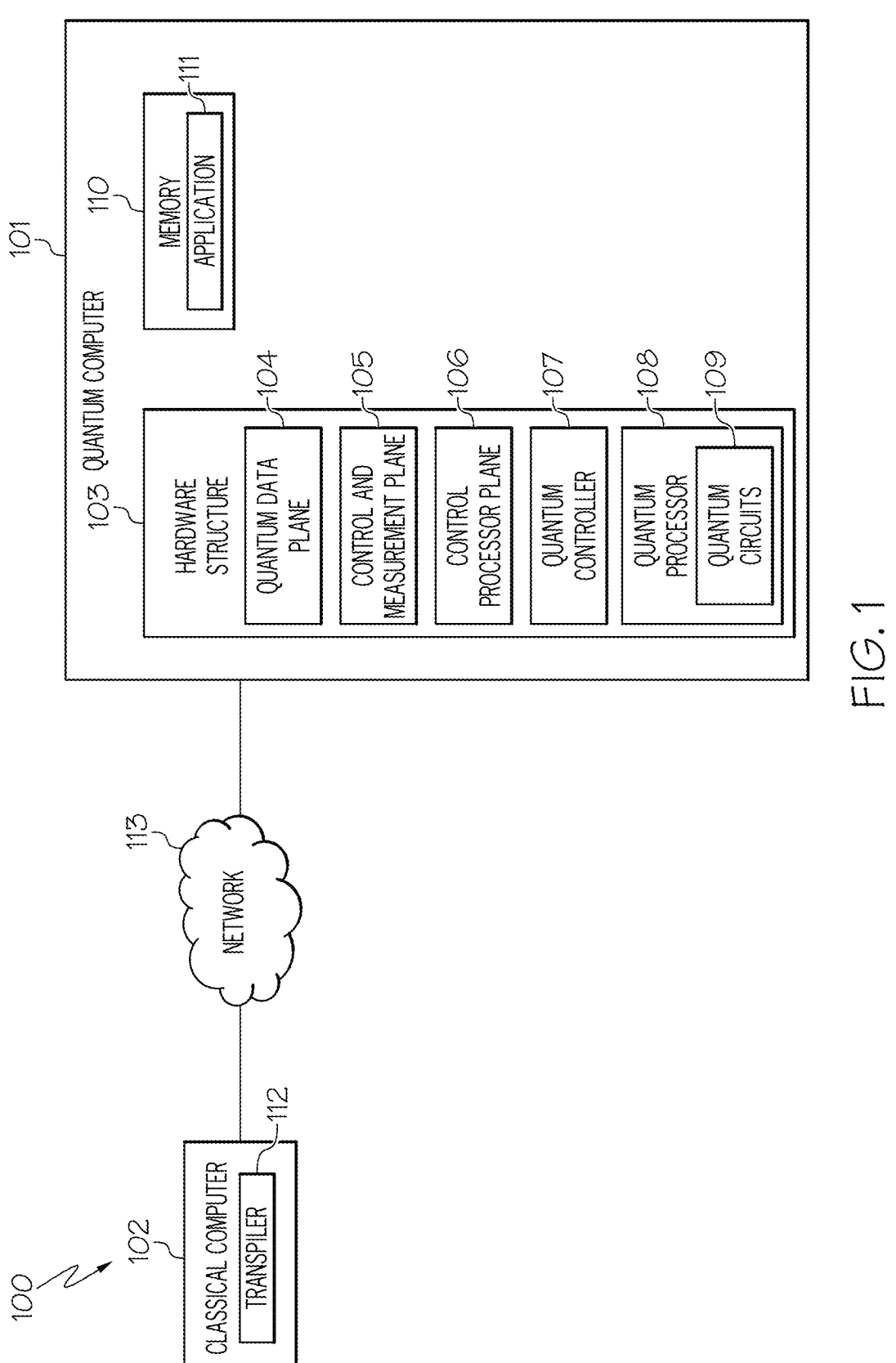
FIG. 1 illustrates a communication system for practicing the principles of the present disclosure in accordance with an embodiment of the present disclosure.

In one embodiment of the present disclosure, a method for reducing the sampling cost of quantum error mitigation comprises generating a map of root errors, where each of the root errors comprises a likelihood an error impacts a state of at least one target qubit. The method further comprises applying a prioritization scheme after using the map to tighten an upper bound on a systematic error of a computation of a quantum error mitigation technique to reduce an error rate of the state of the at least one target qubit.

In this manner, the sampling cost of quantum error mitigation techniques, such as probabilistic error cancellation, is reduced by a prioritization scheme which determines which errors can be ignored instead of cancelled thereby reducing the sampling cost of computations.

Accordingly, there is a reduction in overall execution time for quantum error mitigation techniques, such as probabilistic error cancellation, thereby enabling such techniques to be applied for a wider range of quantum computations, including larger calculations.

Additionally, in one embodiment of the present disclosure, the method further comprises prioritizing error channels defined by a noise model using the upper bound. The method additionally comprises applying anti-noise to mitigate the error channels in order of priority.

In this manner, only the noise that is necessary to be cancelled is cancelled thereby reducing the sampling cost.

Furthermore, in one embodiment of the present disclosure, the method additionally comprises evolving an observable backwards. Furthermore, the method comprises evolving an error forwards.

In this manner, points in the shaded light cone bounding the impact of the error on the observable can be obtained.

Additionally, in one embodiment of the present disclosure, the method further comprises computing a spectral norm of a commutator of the evolved observable and the evolved error.

In this manner, additional points in the shaded light cone bounding the impact of the error on the observable can be obtained.

Furthermore, in one embodiment of the present disclosure, the method additionally comprises evolving local weights backwards. The method further comprises computing a bound on a spectral norm of a commutator of an evolved observable using the evolved local weights.

In this manner, additional points in the shaded light cone bounding the impact of the error on the observable can be obtained.

Additionally, in one embodiment of the present disclosure, the method further comprises selecting which qubits to perform the quantum error mitigation technique based on the map.

In this manner, the quantum error mitigation technique can be more effectively utilized.

Furthermore, in one embodiment of the present disclosure, the quantum error mitigation technique comprises probabilistic error cancellation to reduce the noise rate of Pauli errors occurring in the quantum circuit.

In this manner, the sampling cost of the probabilistic error cancellation technique is reduced thereby enabling the probabilistic error cancellation technique to be applied for a wider range of quantum computations, including larger calculations.

Other forms of the embodiments of the method described above are in a system and in a computer program product.

As stated above, quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes.

Techniques, such as quantum error mitigation techniques, have been developed to reduce (mitigate) the errors that occur in quantum computing algorithms. Such techniques involve running additional modified target circuits (target circuit is the quantum circuit executed on the quantum computer implementing the desired quantum algorithm). As a result, the use of quantum error mitigation techniques generally results in longer execution times. That is, such quantum error mitigation methods reduce the effect of hardware errors at a "sampling cost," where the "sampling cost" refers to running the quantum circuit multiple times.

An example of a quantum error mitigation technique is the probabilistic error cancellation technique. Probabilistic error cancellation (PEC) is an error-mitigation technique that obtains accurate, bias-free estimates of observable expectation values. An observable refers to a property of the system that can be measured, such as position, momentum, angular momentum, energy, a binary value of a qubit, etc. An expectation value refers to the statistical average over classical and quantum randomness. The PEC procedure learns the noise associated with ideal unitary gates and implements a noise inversion ("antinoise") to cancel the noise via probabilistically sampling Pauli operators from an appropriately constructed inverse distribution and inserting them into a modified quantum circuit.

The sampling cost from using PEC grows exponentially with the amount of noise that must be cancelled. As a result, for existing quantum hardware, the use of PEC is limited to relatively small computations. Other quantum error mitigation techniques exist with lower sampling costs; however, such techniques tend to be less accurate than PEC.

Unfortunately, there is not currently an effective means for reducing the sampling cost of PEC while maintaining rigorous accuracy bounds so that PEC can be applied to a wider range of quantum computations, including larger computations.

The embodiments of the present disclosure provide the means for reducing the sampling cost of quantum error mitigation techniques, such as probabilistic error cancellation, by generating a "shaded light cone" for the desired quantum circuit and known noise model, where the "shaded light cone" corresponds to a map of root errors, where each of the root errors includes a likelihood an error impacts a state of at least one target qubit. That is, the shaded light cone corresponds to a map of the effects of quantum circuit errors to inform which errors are to be mitigated. A "noise model," as used herein, refers to a list of rates at which various types of errors (e.g., Pauli errors) occur on the quantum processor during each step in the quantum circuit. In one embodiment, the "shaded light cone" or map is generated by computing time-evolved commutators of local errors (e.g., Pauli errors) and an observable (e.g., energy) or an initial state on a portion of the quantum circuit. A prioritization scheme may then be applied after using the generated map of the effects of quantum circuit errors to tighten an upper bound on an error of a computation of a quantum error mitigation technique (e.g., probabilistic error cancellation). In this manner, the sampling cost of quantum error mitigation techniques, such as probabilistic error cancellation, is reduced thereby enabling such techniques to be applied to a wider range of quantum computations, including larger computations. These and other features will be discussed in further detail below.

While the following discusses the present disclosure in connection with reducing the sampling cost of the probabilistic error cancellation technique, the principles of the present disclosure may be applied to other quantum error mitigation techniques to reduce the sampling cost of such techniques. A person of ordinary skill in the art would be capable of applying the principles of the present disclosure to such implementations. Furthermore, embodiments applying the principles of the present disclosure to such implementations would fall within the scope of the present disclosure.

In some embodiments of the present disclosure, the present disclosure comprises a method, system, and computer program product for reducing the sampling cost of quantum error mitigation. In one embodiment of the present disclosure, a map of root errors ("shaded light cone"), where each root error includes a likelihood an error impacts a state of at least one target qubit, is generated by computing time-evolved commutators of local errors (e.g., Pauli errors) and an observable (e.g., energy) or an initial state on a portion of the quantum circuit. Commutators provide an indication of the extent to which an error impacts the observed outcome with respect to the observable (e.g., energy). An observable, as used herein, refers to the properties of the system that can be measured, such as position, momentum, angular momentum, energy, a binary value of a qubit, etc. A prioritization scheme is then applied after using the generated map of the effects of quantum circuit errors to tighten an upper bound on a systematic error of a computation of a quantum error mitigation technique (e.g., probabilistic error cancellation) to reduce an error rate of the state of at least one target qubit.

For example, error channels defined by a noise model may be prioritized using the upper bound. Anti-noise may then be applied to mitigate the error channels in order of priority. For example, each error channel from high priority to low priority is mitigated until either all the errors are mitigated or the sampling budget is exhausted. The "sampling budget" (also referred to herein as the "sampling budget constraint"), as used herein, refers to the length of time the quantum computation is allowed to run or the maximum number of quantum circuits to be executed. In this manner, the sampling cost of quantum error mitigation techniques, such as probabilistic error cancellation, is reduced by generating a "shaded light cone" which indicates the impact of errors on the final observable, informing a prioritization scheme as to which errors are to be mitigated thereby informing the quantum error mitigation technique as to which errors can be ignored instead of cancelled thereby reducing the sampling cost of computations. As a result, there is a reduction in overall execution time for quantum error mitigation techniques, such as probabilistic error cancellation, thereby enabling such techniques to be applied for a wider range of quantum computations, including larger calculations.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference, and entanglement, as well as a classical computer 102 in which information is stored in bits that are represented logically by either a 0 (off) or a 1 (on). Examples of classical computer 102 include, but are not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to set up the state of quantum bits in quantum computer 101 and then quantum computer 101 starts the quantum process. Furthermore, in one embodiment, classical computer 102 is configured to reduce the sampling cost of quantum error mitigation, such as the probabilistic error cancellation technique, as discussed further below.

In one embodiment, a hardware structure 103 of quantum computer 101 includes a quantum data plane 104, a control and measurement plane 105, a control processor plane 106, a quantum controller 107, and a quantum processor 108. While depicted as being located on a single machine, quantum data plane 104, control and measurement plane 105, and control processor plane 106 may be distributed across multiple computing machines, such as in a cloud computing architecture, and communicate with quantum controller 107, which may be located in close proximity to quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state, and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gates, are all reversible. Examples of quantum logic gates include RX (performs $e^{i\theta X/2}$, which corresponds to a rotation of the qubit state around the X-axis by the given angle theta $\theta$ on the Bloch sphere), RY (performs $e^{i\theta Y/2}$, which corresponds to a rotation of the qubit state around the Y-axis by the given angle theta $\theta$ on the Bloch sphere), RXX (performs the operation $e^{(-i\theta\otimes X/2)}$ on the input qubit), RZZ (takes in one input, an angle theta $\theta$ expressed in radians, and it acts on two qubits), etc. In one embodiment, quantum circuits 109 are written such that the horizontal axis is time, starting at the left-hand side and ending at the right-hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for reducing the sampling cost of quantum error mitigation, such as the probabilistic error cancellation technique, as discussed further below in connection with FIGS. 2-4 and 6-9. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses, and algorithms) rewrites a given input circuit to match the topology of a specific quantum device and/or to optimize the quantum circuit for execution. In one embodiment, transpiler 112 converts a trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters, and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to set up the state of quantum bits in quantum computer 101, may be connected to quantum computer 101 via network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to reduce the sampling cost of quantum error mitigation, such as the probabilistic error cancellation technique, as discussed further below in connection with FIGS. 2-4 and 6-9. A description of the software components of classical computer 102 is provided below in connection with FIG. 2 and a description of the hardware configuration of classical computer 102 is provided further below in connection with FIG. 5.

System 100 is not to be limited in scope to any one particular network architecture. System 100 may include any number of quantum computers 101, classical computers 102, and networks 113.

A discussion regarding the software components used by classical computer 102 for reducing the sampling cost of quantum error mitigation, such as the probabilistic error cancellation technique, is provided below in connection with FIG. 2.

Figure 2:
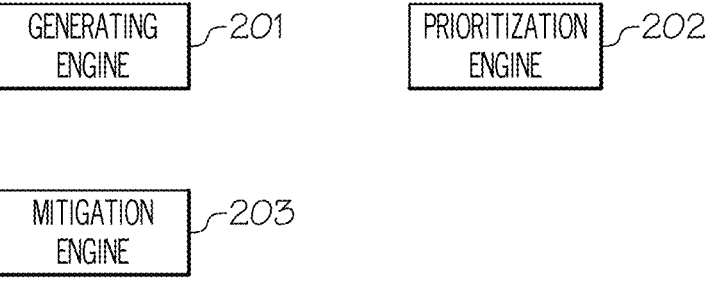
FIG. 2 is a diagram of the software components of the classical computer for reducing the sampling cost of quantum error mitigation in accordance with an embodiment of the present disclosure.

FIG. 2 is a diagram of the software components of classical computer 102 (FIG. 1) for reducing the sampling cost of quantum error mitigation, such as the probabilistic error cancellation technique, in accordance with an embodiment of the present disclosure.

Referring to FIG. 2, in conjunction with FIG. 1, classical computer 102 includes a generating engine 201 configured to generate a "shaded light cone" for the desired quantum circuit and known noise model. A "shaded light cone," as used herein, refers to a map of root errors, where each of the root errors includes a likelihood an error impacts a state of at least one target qubit (corresponds to the qubit for which operations are performed by the target quantum circuit). That is, the shaded light cone is a map of the effects of quantum circuit errors to inform which errors are to be mitigated. A "noise model," as used herein, refers to a list of rates at which various types of errors occur on the quantum processor (e.g., quantum processor 108) during each step in the quantum circuit (e.g., quantum circuit 109).

In one embodiment, an expectation value of an operator at the end of the quantum circuit (e.g., quantum circuit 109) is desired to be estimated but quantum hardware introduces error channels which are described by the noise model. An expectation value, as used herein, refers to the probabilistic expected values of the quantum circuit. An operator, as used herein, refers to a mathematical entity used to represent a physical process that results in the change of the state vector of the system, such as the evolution of these states with time. A quantum circuit (e.g., quantum circuit 109), as used herein, is described in terms of layers of ideal gates interleaved with noise channels defined by the noise model. The order of layers is specified by the index L.

In one embodiment, the noise model defines a set of error channels $\{A_i\}=\{(E_i, p_i, Q_i, L_i)\}$ that may occur throughout the quantum circuit ("error channels"). E refers to the type of error (for Pauli error channels, this is the type of Pauli error, e.g., E=X for a bitflip error), p is the probability of the error occurring, Q indicates the qubits on which the error occurs, and L indicates the layer index, or equivalently the time, in the quantum circuit at which the error occurs.

In one embodiment, generating engine 201 generates a map of root errors, where each of the root errors includes a likelihood an error impacts a state of at least one target qubit (corresponds to the qubit for which operations are performed by the target quantum circuit). That is, generating engine 201 generates a map of the effects of quantum circuit errors to inform which errors are to be mitigated. In one embodiment, such a map is generated by computing time-evolved commutators of local errors (e.g., Pauli errors) and an observable or an initial state on a portion of the quantum circuit (e.g., quantum circuit 109). Local errors, as used herein, refer to errors initially localized to a small number of nearby qubits thereby corresponding to low-weight errors.

Figure 3:
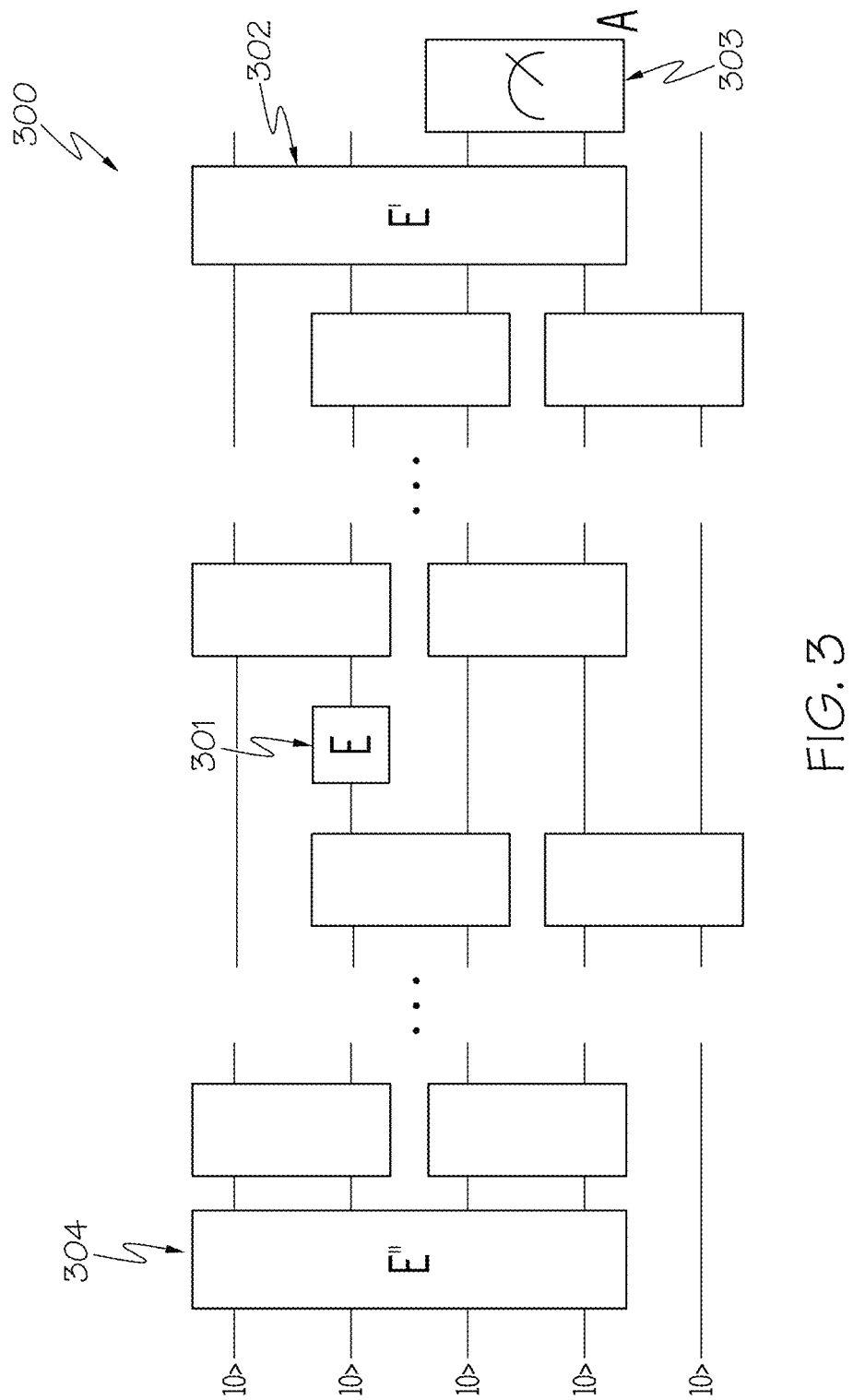
FIG. 3 illustrates determining how much the error propagates to the observable in accordance with an embodiment of the present disclosure.

With respect to computing time-evolved commutators of local errors (e.g., Pauli errors) and an observable on a portion of the quantum circuit, the errors are evolved to the end of the quantum circuit where commutators are evaluated with an observable (A) as illustrated in FIG. 3.

FIG. 3 illustrates determining how much the error propagates to the observable in accordance with an embodiment of the present disclosure.

Referring to FIG. 3, FIG. 3 illustrates a diagram 300 of the quantum circuit (e.g., quantum circuit 109), in which an error 301 (e.g., Pauli error), E, occurs during an early portion of the quantum circuit. A determination is then made by generating engine 201 as to how much such an error, such as error 301, can change the observable, observable A 303. Mathematically, such a determination, may be expressed as:

$$| < A >_{error} - < A >_{no\ error}| \leq |[E', A]|$$

where $<A>_{error}$ corresponds to the expectation of the operator when the quantum circuit is affected by the error, $<A>_{no\ error}$ corresponds to the expectation of the operator not affected by the error, and E' 302 refers to the time-evolved error (forward-propagated Pauli error), which corresponds to the change of the error brought about by the evolution of the quantum circuit, such as the end of the quantum circuit. Also, |·| refers to the spectral norm, which is the largest of the singular values.

Furthermore, FIG. 3 illustrates the backward-propagated error (e.g., Pauli error), E'' 304. In one embodiment, generating engine 201 evolves the error backwards. Furthermore, generating engine 201 computes the L1 Schatten norm of a commutator of a backward-time-evolved error with an initial state (ρ). A determination is then made by generating engine 201 as to how much such an error, such as error 304, can change the observable, observable A 303. Mathematically, such a determination, may be expressed as:

$$| < A >_{error} - < A >_{no\ error}| \leq |[E'', \rho]|_1$$

Figure 4:
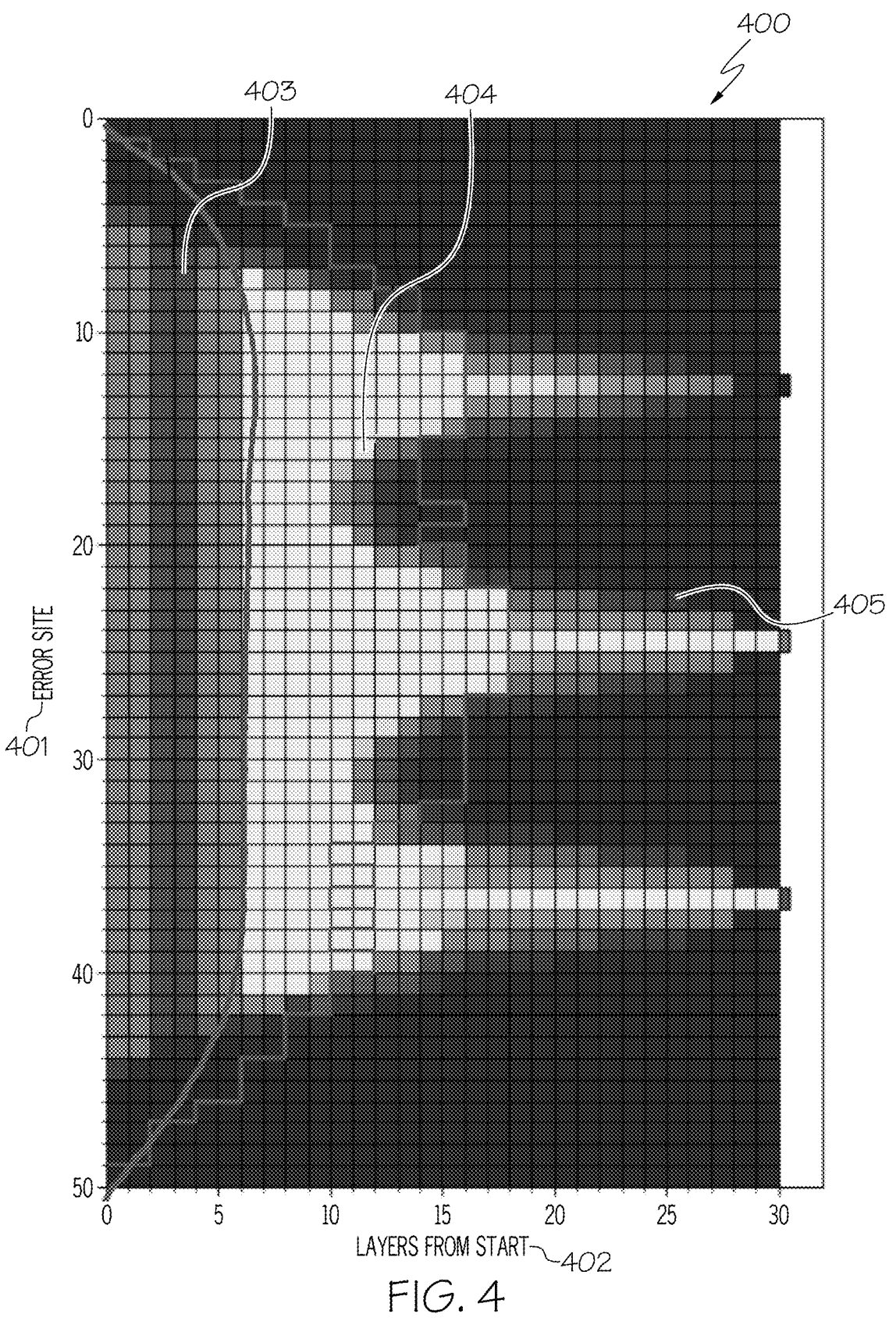
FIG. 4 illustrates a shaded light cone with three different regions in accordance with an embodiment of the present disclosure.

In one embodiment, the quantity |[E', A]| or |[E'', ρ]|₁ corresponds to the shaded light cone as shown in FIG. 4.

FIG. 4 illustrates a shaded light cone 400 with three different regions in accordance with an embodiment of the present disclosure.

Referring to FIG. 4, shaded light cone 400 corresponds to a map of root errors, where each of the root errors includes a likelihood an error impacts a state of at least one target qubit (corresponds to the qubit for which operations are performed by the target quantum circuit). That is, shaded light cone 400 corresponds to a map of the effects of quantum circuit errors to inform which errors are to be mitigated. In one embodiment, shaded light cone 400 indicates a bound on the impact of quantum circuit errors at an error site 401 at a layer 402 of the quantum circuit on the final observable.

As shown in FIG. 4, there are three regions of shaded light cone 400, such as region 403 containing values corresponding to the Schatten norm bound via evolving the error backwards, region 404 containing values corresponding to the spectral norm bound by evolving the local weights, and region 405 containing values corresponding to the spectral norm bound via evolving errors forward and/or evolving an observable backwards.

While FIG. 4 illustrates shaded light cone 400 for one type of error (e.g., Pauli X), shaded light cone 400 may be utilized for multiple type of errors.

Returning to FIG. 2, in conjunction with FIGS. 1 and 3-4, in one embodiment, the determination as to how much the error changes the operator is obtained by computing time-evolved commutators of local errors (e.g., Pauli errors) and an observable on a portion of the quantum circuit. Commutators provide an indication of the extent to which an error impacts the observed outcome with respect to the observable (e.g., energy). An observable, as used herein, refers to the properties of the system that can be measured, such as position, momentum, angular momentum, energy, a binary value of a qubit, etc. In such an embodiment, bias $\varepsilon=|\mathrm{Tr}(A\rho)-\mathrm{Tr}(A\tilde{\rho})|$. $\mathrm{Tr}(A\rho)$ corresponds to the expectation of the observable with respect to the state at the end of the noise circuit. $\mathrm{Tr}(A\tilde{\rho})$ corresponds to the expectation of the observable with respect to the state of the quantum circuit with the error channel of interest. As a result, $\varepsilon \leq |[E', A]|$ and $\varepsilon \leq |[E'', \rho]|_1$. Consequently, the commutators $|[E', A]|$ and $|[E'', \rho]|_1$ bound the bias $\varepsilon$. Such a bound is utilized to determine which errors are to be mitigated based on including such errors in the shaded light cone.

In one embodiment, generating engine 201 computes time-evolved commutators of local errors (e.g., Pauli errors) and an observable on a portion (e.g., beginning) of the quantum circuit (e.g., quantum circuit 109) by computing a spectral norm of a commutator of a time-evolved error with the observable for each error channel in the quantum circuit. The "spectral norm," as used herein, refers to the maximum singular value of a matrix. For example, spectral norm $|A|$ corresponds to the largest singular value of A.

In one embodiment, generating engine 201 obtains an upper bound on how much the error channel contributes to the bias (average error) of the result based on the quantity (based on the computed spectral norm of the commutator of the time-evolved error with the observable). That is, such a quantity provides a point in the "shaded light cone."

In connection with computing the values of region 405, in one embodiment, since each error channel and each gate act on only a few qubits, generating engine 201 computes how this error evolves forward through a nonzero number of gate layers in the quantum circuit. Such a computation is inexpensive for errors occurring near the end of the quantum circuit, but exponentially expensive for errors occurring earlier in the quantum circuit. As a result, in one embodiment, generating engine 201 performs the computation for errors near the end of the quantum circuit, working backwards until the computation exceeds a user-defined difficulty threshold (maximum time or maximum memory required).

In connection with computing the values of region 403, in one embodiment, additional light cone shading can be performed for errors occurring near the beginning of the quantum circuit.

These errors can be evolved backwards to the beginning of the quantum circuit. In one embodiment, the Schatten L1 norm of the commutator of the backwards-evolved error with the initial state of the qubits ($\rho$) provides an upper bound on how much that error channel contributes to the bias (average error) of the result, i.e., another point in the shaded light cone. The Schatten L1 norm $|A|_1$ corresponds to the sum of the singular values of A.

In one embodiment, generating engine 201 evolves the error backwards in time and computes the Schatten L1 norm of that evolved error with the initial density matrix (initial state). Such a computation provides another bound on the bias due to the error.

In one embodiment, generating engine 201 computes how errors occurring near the beginning of the quantum circuit evolve backwards thereby shading in more points in the light cone until the computation difficulty exceeds a user-selected threshold.

In one embodiment, points in the shaded light cone (e.g., shaded light cone 400) are established based on the computations discussed above (computing time-evolved commutators of local errors and an observable on a portion of the quantum circuit). In one embodiment, such points are established in response to identifying values of the computations that exceed or less than a user-designated threshold value.

As discussed above, generating engine 201 generates a map of root errors, where each of the root errors includes a likelihood an error impacts a state of at least one target qubit (corresponds to the qubit for which operations are performed by the target quantum circuit). That is, generating engine 201 generates a map of the effects of quantum circuit errors to inform which errors are to be mitigated. In one embodiment, such a map is generated by computing time-evolved commutators of local errors (e.g., Pauli errors) and an observable or an initial state on a first portion of the quantum circuit (e.g., quantum circuit 109) as well as evolving the local weights through a second portion of the quantum circuit (e.g., quantum circuit 109). In one embodiment, generating engine 201 evolves the local weights (e.g., Pauli weights) through a second portion of the quantum circuit, such as starting from the location in the quantum circuit corresponding to the completion of the computation of the spectral norm of the commutator of a time-evolved error with the observable for each error channel in the quantum circuit.

In connection with computing values of region 404, in one embodiment, such an evolution of the local weights (e.g., Pauli weights) through a second portion of the quantum circuit is accomplished by generating engine 201 evolving the observable (e.g., energy) backwards. Generating engine 201 may then compute the backward-evolving observable using the upper bounds on its X, Y, and Z components on each qubit at each layer as discussed below.

In one embodiment, generating engine 201 performs a fast computation that extends the results to shade more of the light cone in addition to the points in the shaded light cone identified by computing the time-evolved commutators of local errors and an observable as discussed above.

In one embodiment, such a fast computation involves evolving the observable backwards rather than evolving the error forwards. Also, generating engine 201 upper bounds the backward-evolving observable's X, Y, Z components on each qubit at each layer.

In one embodiment, at a given layer, there are a list of numbers (e.g., three) for each qubit with the values between 0 and 1. Each number is an upper bound on either the X, Y, or Z components of the backward-evolving observable on a qubit at the layer. These upper bounds are in turn upper bounds on the spectral norms of the commutator between the corresponding X, Y, or Z errors and the backward-evolving observable.

In one embodiment, the list of upper bounds at layer k is computed recursively backwards by generating engine 201 from the end of the quantum circuit, using the upper bounds at layer k+1. The starting point of this recursion is a layer where the backward-evolving observable can be computed exactly. Since each layer may involve only one- and two-qubit gates, generating engine 201 computes the upper bounds for each qubit at layer k from the upper bounds for at most 2 qubits from layer k+1, making the computation of the bounds efficient.

Furthermore, FIG. 4 illustrates the filling of the shaded light cone by time-evolved commutators. Additionally, FIG. 4 illustrates the further filling of the shaded light cone by evolving local weights in accordance with an embodiment of the present disclosure.

As illustrated in FIG. 4, shaded light cone 400 (map of root errors, i.e., map of the effects of quantum circuit errors to inform which errors are to be mitigated) illustrates the error sites 401 for the various layers 402 by computing time-evolved commutators of local errors and an observable. Such a shaded light cone 400 may be further filled by evolving local weights as discussed above.

Returning to FIG. 2, in conjunction with FIGS. 1 and 3-4, generating engine 201 evolves the local weights through a second portion of the quantum circuit (e.g., quantum circuit 109) recursively as discussed above in connection with region 404 of FIG. 4.

At a given layer, an evolved operator can be written as a sum of Pauli operators:

$$O = \sum_{s_1}\sum_{s_2} \cdots \sum_{s_n} c_{s_1,s_2,\dots,s_n} \sigma_{s_1} \otimes \sigma_{s_2} \otimes \dots \otimes \sigma_{s_n}$$

For example:

$$O = c_{x,x,y}XXY + c_{y,x,z}YXZ + c_{z,y,z}ZYZ + \dots$$

At a given layer, the local weights are defined as $$f_j^\mu = \sum_{s_1}\sum_{s_2} \cdots \sum_{s_{j-1}}\sum_{s_{j+1}} \cdots \sum_{s_n} |c_{s_1,s_2,\dots,s_{j-1},\mu,s_{j+1},s_n}|$$

which equals the total weights of Pauli strings that have $\sigma_\mu$ on site j. For example:

$$f_2^x = |c_{x,x,y}| + |c_{y,x,z}| + \dots$$

Given the upper bounds $$f_j^\mu \le w_j^\mu$$

on $$f_j^\mu$$

of O, which is the observable evolved to the layer of the error, the upper bound on the commutator using $$w_j^\mu$$

is the following:

$$\|[O, X_2]\| \le 2(f_2^y + f_2^z) \le 2(w_2^y + w_2^z)$$

where $$w_j^\mu$$

corresponds to the weights of the Pauli strings that have $\sigma_\mu$ on site j.

In one embodiment, the local weights of O are evolved by a Pauli transfer matrix W for qubit 1 and 2. Hence, the upper bounds may then be computed recursively as follows:

$$\tilde{f}_1^\mu \le \sum_v \sum_{\mu',v'} |W_{\mu',v',\mu v}| \min\left\{w_1^{\mu'}, w_2^{v'}\right\}$$

which is equal to $\tilde{w}_1$.

Furthermore, classical computer 102 includes a prioritization engine 202 configured to apply a prioritization scheme after using the generated map of the effects of quantum circuit errors to tighten an upper bound on an error of a computation of a quantum error mitigation technique (e.g., probabilistic error correction technique). Tightening an upper bound on a quantity, as used herein, refers to not having a smaller value be the upper bound. That is, by tightening an upper bound on a quantity, a claim that an existing guarantee that the quantity is less than a value is taken and strengthened by guaranteeing that the quantity is less than a smaller value. By tightening the upper bound, stronger accuracy guarantees are achieved while simultaneously lowering sampling cost. That is, by tightening the upper bound, errors that do not affect the outcome of the result of the quantum circuit will be identified as corresponding to errors that should be ignored thereby reducing the sampling cost since such errors do not have to be cancelled which involves multiple runs of the quantum circuit.

For example, in one embodiment, prioritization engine 202 prioritizes error channels defined by a noise model using the upper bound. In one embodiment, such a noise model corresponds to the Pauli-Lindblad noise model, where the probability of an error $p_i$ can be defined in terms of an error rate $\lambda_i$ as $$p_i = \frac{1}{2}\left(1 - e^{-2\lambda_i}\right).$$

In one embodiment, for each error channel $\Lambda_i$ the shaded light cone is a commutator bound $C_{E_i}$ which may be $|[E_i, A]$, $|[E_i, \rho]|_1$, or the result of the computation for evolving local weights through a second portion of the quantum circuit as discussed above.

In one embodiment, the rates $$\lambda_i^*$$

at which the quantum error mitigation technique (e.g., PEC technique) applies "antinoise" is selected to cancel the error channels $\Lambda_i$. That is, prioritization engine 202 selects how much antinoise to apply.

The commutator norms provide an upper bound on the bias:

$$\varepsilon \le \sum_i \frac{1 - \exp(-2(\lambda_i - \lambda_i^*))}{2} C_{E_i}$$

As a result, prioritization engine 202 can select $$\lambda_i^*$$

to minimize this worst-case bias within the sampling budget constraint which can be quantified by $$\sum_i \lambda_i^*.$$

The "sampling budget constraint," as used herein, refers to the length of time the quantum computation is allowed to run. That is, the "sampling budget constraint" indicates how many times the quantum circuit can be run or its modifications.

In one embodiment, the minimization of the worst-case bias is achieved by sorting the error channels by their "priority" $e^{-2\lambda_i} C_{E_i}$.

Classical computer 102 additionally includes mitigation engine 203 configured to apply anti-noise to mitigate the error channels in order of priority.

For example, mitigation engine 203 mitigates each error channel $$(\lambda_i^* = \lambda_i)$$

from high priority to low priority until either all the errors are mitigated, a desired accuracy guarantee is achieved, or the sampling budget is exhausted.

Other prioritization strategies based on the shaded light cone discussed herein may be possible to minimize the typical bias rather than the worst-case bias.

Upon applying anti-noise to mitigate the error channels in order of priority, in one embodiment, mitigation engine 203 performs the quantum error mitigation technique on selected qubits, where such qubits are selected based on the map ("shaded light cone"), such as those associated with a likelihood that an error impacts the state of the qubit that exceeds a threshold value, which may be user-designated. In this manner, the quantum error mitigation technique is more effectively utilized.

A further description of these and other functions is provided below in connection with the discussion of the method for reducing the sampling cost of quantum error mitigation, such as the probabilistic error cancellation technique.

Prior to the discussion of the method for reducing the sampling cost of quantum error mitigation, a description of the hardware configuration of classical computer 102 (FIG. 1) is provided below in connection with FIG. 5.

Figure 5:
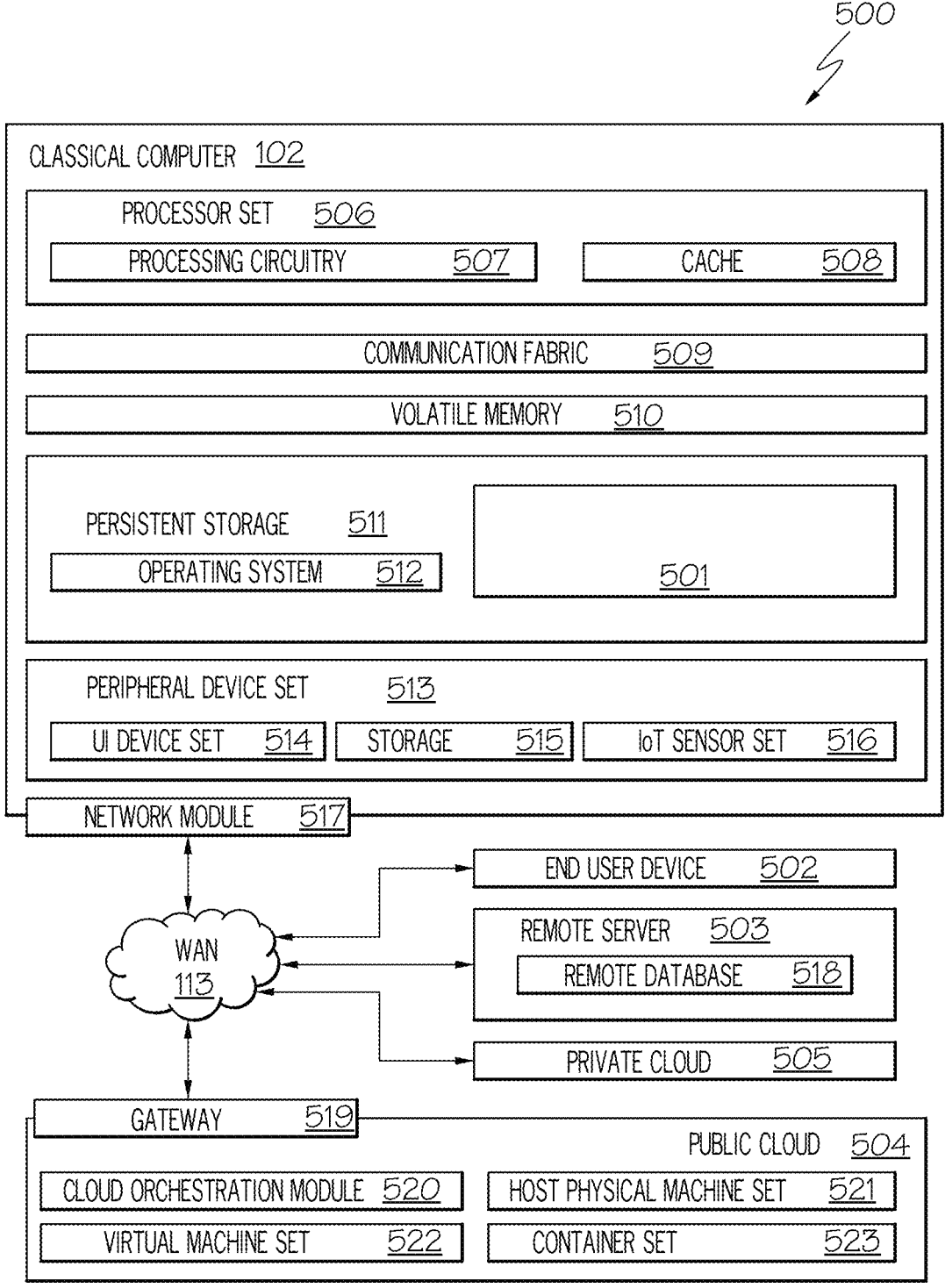
FIG. 5 illustrates an embodiment of the present disclosure of the hardware configuration of the classical computer which is representative of a hardware environment for practicing the present disclosure.

Referring now to FIG. 5, in conjunction with FIG. 1, FIG. 5 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code 501 involved in performing the inventive methods, such as reducing the sampling cost of quantum error mitigation. In addition to block 501, computing environment 500 includes, for example, classical computer 102, network 113, such as a wide area network (WAN), end user device (EUD) 502, remote server 503, public cloud 504, and private cloud 505. In this embodiment, classical computer 102 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT)

sensor set 516), and network module 517. Remote server 503 includes remote database 518. Public cloud 504 includes gateway 519, cloud orchestration module 520, host physical machine set 521, virtual machine set 522, and container set 523.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically classical computer 102, to keep the presentation as simple as possible. Classical computer 102 may be located in a cloud, even though it is not shown in a cloud in FIG. 5. On the other hand, classical computer 102 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto classical computer 102 to cause a series of operational steps to be performed by processor set 506 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 508 and the other storage media discussed below. The program instructions, and associated data, are accessed by processor set 506 to control and direct performance of the inventive methods. In computing environment 500, at least some of the instructions for performing the inventive methods may be stored in block 501 in persistent storage 511.

Communication fabric 509 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 510 is located in a single package and is internal to classical computer 102, but, alternatively or additionally, the volatile memory may be distributed over multiple packages and/or located externally with respect to classical computer 102.

Persistent Storage 511 is any form of non-volatile storage for computers that is now known or to be developed in the future. The non-volatility of this storage means that the stored data is maintained regardless of whether power is being supplied to classical computer 102 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the inventive methods.

Peripheral device set 513 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows classical computer 102 to communicate with other computers through WAN 113. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the inventive methods can typically be downloaded to classical computer 102 from an external computer or external storage device through a network adapter card or network interface included in network module 517.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates classical computer 102), and may take any of the forms discussed above in connection with classical computer 102. EUD 502 typically receives helpful and useful data from the operations of classical computer 102. For example, in a hypothetical case where classical computer 102 is designed to provide a recommendation to an end user, this recommendation would typically be communicated from network module 517 of classical computer 102 through WAN 113 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to classical computer 102. Remote server 503 may be controlled and used by the same entity that operates classical computer 102. Remote server 503 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520.

The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to reduce the sampling cost of quantum error mitigation. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for reducing the sampling cost of quantum error mitigation, may be embodied in an application specific integrated circuit.

As stated above, quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes. Techniques, such as quantum error mitigation techniques, have been developed to reduce (mitigate) the errors that occur in quantum computing algorithms. Such techniques involve running additional modified target circuits (target circuit is the quantum circuit executed on the quantum computer implementing the desired quantum algorithm). As a result, the use of quantum error mitigation techniques generally results in longer execution times. That is, such quantum error mitigation methods reduce the effect of hardware errors at a "sampling cost," where the "sampling cost" refers to running the quantum circuit multiple times. An example of a quantum error mitigation technique is the probabilistic error cancellation technique. Probabilistic error cancellation (PEC) is an error-mitigation technique that obtains accurate, bias-free estimates of observable expectation values. An observable refers to a property of the system that can be measured, such as position, momentum, angular momentum, energy, a binary value of a qubit, etc. An expectation value refers to the statistical average over classical and quantum randomness. The PEC procedure learns the noise associated with ideal unitary gates and implements a noise inversion ("antinoise") to cancel the noise via probabilistically sampling Pauli operators from an appropriately constructed inverse distribution and inserting them into a modified quantum circuit. The sampling cost from using PEC grows exponentially with the amount of noise that must be cancelled. As a result, for existing quantum hardware, the use of PEC is limited to relatively small computations. Other quantum error mitigation techniques exist with lower sampling costs; however, such techniques tend to be less accurate than PEC. Unfortunately, there is not currently an effective means for reducing the sampling cost of PEC while maintaining rigorous accuracy bounds so that PEC can be applied to a wider range of quantum computations, including larger computations.

Figure 7:
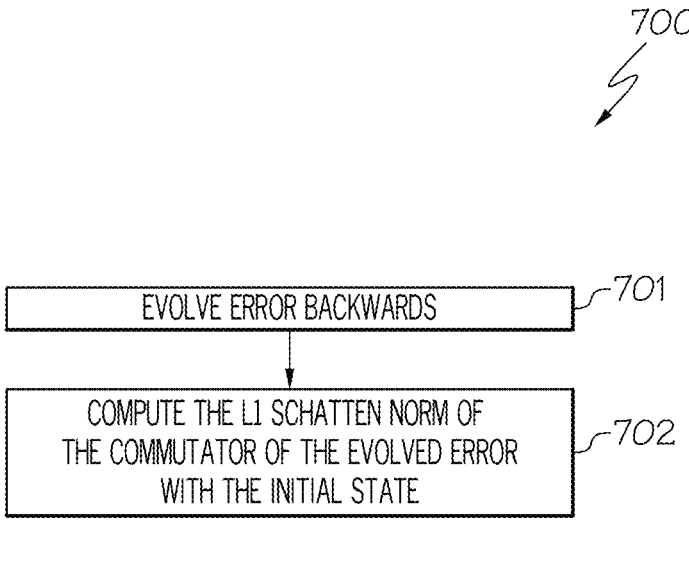
FIG. 7 is a flowchart of a method for computing the values in a first region of the shaded light cone in accordance with an embodiment of the present disclosure.
Figure 8:
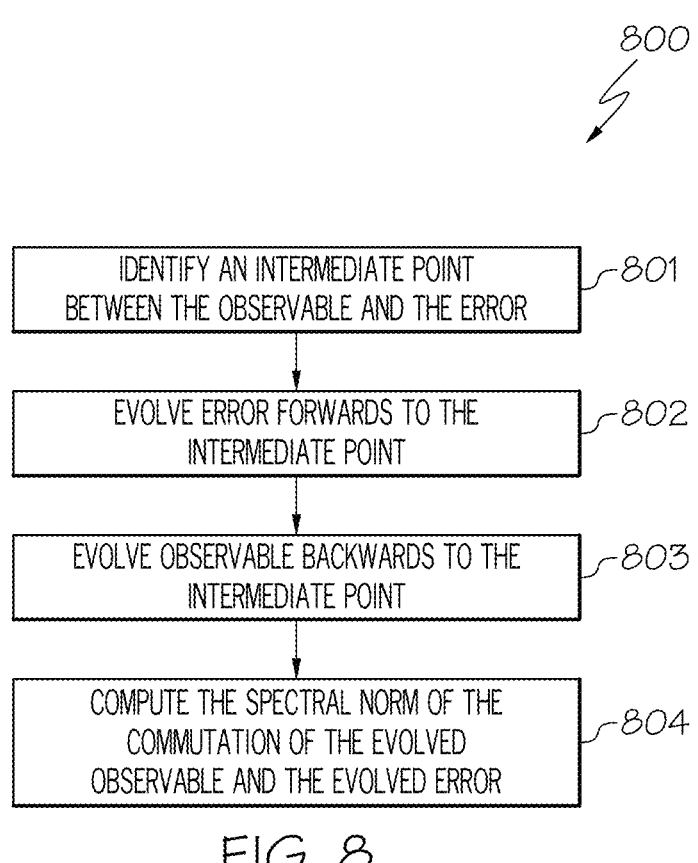
FIG. 8 is a flowchart of a method for computing the values in a second region of the shaded light cone in accordance with an embodiment of the present disclosure.
Figure 9:
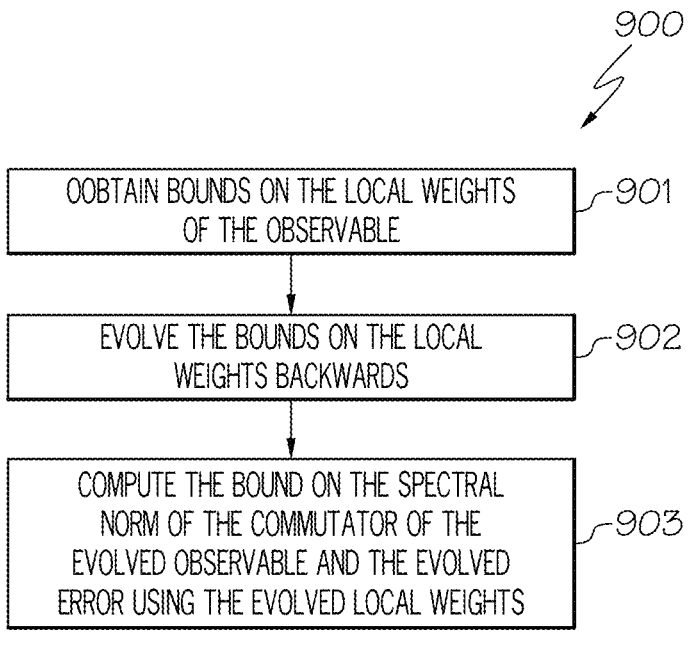
FIG. 9 is a flowchart of a method for computing the values in a third region of the shaded light cone in accordance with an embodiment of the present disclosure.

The embodiments of the present disclosure provide the means for reducing the sampling cost of quantum error mitigation techniques, such as the probabilistic error cancellation technique, by generating a "shaded light cone" for the desired quantum circuit and known noise model, where the "shaded light cone" corresponds to a map of root errors (i.e., a map of the effects of quantum circuit errors to inform which errors are to be mitigated), as discussed below in connection with FIGS. 6-9. FIG. 6 is a flowchart of a method for reducing the sampling cost of quantum error mitigation. FIG. 7 is a flowchart of a method for computing the values in a first region of the shaded light cone. FIG. 8 is a flowchart of a method for computing the values in a second region of the shaded light cone. FIG. 9 is a flowchart of a method for computing the values in a third region of the shaded light cone.

As stated above, FIG. 6 is a flowchart of a method 600 for reducing the sampling cost of quantum error mitigation in accordance with an embodiment of the present disclosure.

Referring to FIG. 6, in conjunction with FIGS. 1-5, in step 601, generating engine 201 of classical computer 102 generates a "shaded light cone" for the desired quantum circuit and known noise model by computing time-evolved commutators of local errors (e.g., Pauli errors) and an observable on a first portion of the quantum circuit (e.g., quantum circuit 109) and evolving local weights (e.g., Pauli weights) through a second portion of the quantum circuit. A "shaded light cone," as used herein, refers to a map of root errors, where each of the root errors includes a likelihood an error impacts a state of at least one target qubit (corresponds to the qubit for which operations are performed by the target quantum circuit). That is, the shaded light cone is a map of the effects of quantum circuit errors to inform which errors are to be mitigated. A "noise model," as used herein, refers to a list of rates at which various types of errors occur on the quantum processor (e.g., quantum processor 108) during each step in the quantum circuit. "Local errors," as used herein, refer to errors initially localized to a small number of nearby qubits thereby corresponding to low-weight errors.

As discussed above, in one embodiment, an expectation value of an operator at the end of the quantum circuit (e.g., quantum circuit 109) is desired to be estimated but quantum hardware introduces error channels which are described by the noise model. An expectation value, as used herein, refers to the probabilistic expected values of the quantum circuit. An operator, as used herein, refers to a mathematical entity used to represent a physical process that results in the change of the state vector of the system, such as the evolution of these states with time. A quantum circuit (e.g., quantum circuit 109), as used herein, is described in terms of layers of ideal gates interleaved with noise channels defined by the noise model. The order of layers is specified by the index L.

In one embodiment, the noise model defines a set of error channels $\{\Lambda_i\}=\{(E_i, p_i, Q_i, L_i)\}$ that may occur throughout the quantum circuit ("error channels"). E refers to the type of error (for Pauli error channels, this is the type of Pauli error, e.g., E=X for a bitflip error), p is the probability of the error occurring, Q indicates the qubits on which the error occurs, and L indicates the layer index, or equivalently the time, in the quantum circuit at which the error occurs.

In one embodiment, generating engine 201 generates a map of root errors, where each of the root errors includes a likelihood an error impacts a state of at least one target qubit (corresponds to the qubit for which operations are performed by the target quantum circuit). That is, generating engine 201 generates a map of the effects of quantum circuit errors to inform which errors are to be mitigated. In one embodiment, such a map is generated by computing time-evolved commutators of local errors (e.g., Pauli errors) and an observable or an initial state on a portion of the quantum circuit (e.g., quantum circuit 109). Local errors, as used herein, refer to errors initially localized to a small number of nearby qubits thereby corresponding to low-weight errors.

With respect to computing time-evolved commutators of local errors (e.g., Pauli errors) and an observable on a first portion of the quantum circuit, the errors are evolved to the end of the quantum circuit where commutators are evaluated with an observable (A) as illustrated in FIG. 3.

Referring to FIG. 3, FIG. 3 illustrates a diagram 300 of the quantum circuit (e.g., quantum circuit 109), in which an error 301 (e.g., Pauli error), E, occurs during an early portion of the quantum circuit. A determination is then made by generating engine 201 as to how much such an error, such as error 301, can change the observable, observable A 303. Mathematically, such a determination, may be expressed as:

$$| < A >_{error} - < A >_{no\ error}| \le |[E', A]|$$

where $<A>_{error}$ corresponds to the expectation of the operator when the quantum circuit is affected by the error, $<A>_{no\ error}$ corresponds to the expectation of the operator not affected by the error, and E' 302 refers to the time-evolved error (forward-propagated Pauli error), which corresponds to the change of the error brought about by the evolution of the quantum circuit, such as the end of the quantum circuit. Also, |·| refers to the spectral norm, which is the largest of the singular values.

Furthermore, FIG. 3 illustrates the backward-propagated error (e.g., Pauli error), E'' 304. In one embodiment, generating engine 201 evolves the error backwards. Furthermore, generating engine 201 computes the L1 Schatten norm of a commutator of a backward-time-evolved error with an initial state ($\rho$). A determination is then made by generating engine 201 as to how much such an error, such as error 301, can change the observable, observable A 303. Mathematically, such a determination, may be expressed as:

$$| < A >_{error} - < A >_{no\ error} | \leq |[E'', \rho]|_1$$

In one embodiment, the quantity $|[E', A]|$ or $|[E'', \rho]|_1$ corresponds to the shaded light cone as shown in FIG. 4.

Referring to FIG. 4, shaded light cone 400 corresponds to a map of root errors, where each of the root errors includes a likelihood an error impacts a state of at least one target qubit. That is, shaded light cone 400 corresponds to a map of the effects of quantum circuit errors to inform which errors are to be mitigated. In one embodiment, shaded light cone 400 indicates a bound on the impact of quantum circuit errors at an error site 401 at a layer 402 of the quantum circuit on the final observable.

As shown in FIG. 4, there are three regions of shaded light cone 400, such as region 403 containing values corresponding to the Schatten norm bound via evolving the error backwards, region 404 containing values corresponding to the spectral norm bound by evolving the local weights, and region 405 containing values corresponding to the spectral norm bound via evolving errors forward and/or evolving an observable backwards.

While FIG. 4 illustrates shaded light cone 400 for one type of error (e.g., Pauli X), shaded light cone 400 may be utilized for multiple type of errors.

In one embodiment, the determination as to how much the error changes the operator is obtained by computing time-evolved commutators of local errors (e.g., Pauli errors) and an observable on a first portion of the quantum circuit. Commutators provide an indication of the extent to which an error impacts the observed outcome with respect to the observable (e.g., energy). An observable, as used herein, refers to the properties of the system that can be measured, such as position, momentum, angular momentum, energy, a binary value of a qubit, etc. In such an embodiment, bias $\varepsilon = |Tr(A\rho) - Tr(A\tilde{\rho})|$. $Tr(A\rho)$ corresponds to the expectation of the observable with respect to the state at the end of the noise circuit. $Tr(A\tilde{\rho})$ corresponds to the expectation of the observable with respect to the state of the quantum circuit with the error channel of interest. As a result, $\varepsilon \leq |[E', A]|$ and $\varepsilon \leq |[E'', \rho]|_1$. Consequently, the commutators $|[E', A]|$ and $|[E'', \rho]|_1$ bound the bias $\varepsilon$. Such a bound is utilized to determine which errors are to be mitigated based on including such errors in the shaded light cone.

In one embodiment, generating engine 201 computes time-evolved commutators of local errors (e.g., Pauli errors) and an observable on a first portion (e.g., beginning) of the quantum circuit (e.g., quantum circuit 109) by computing a spectral norm of a commutator of a time-evolved error with the observable for each error channel in the quantum circuit. The "spectral norm," as used herein, refers to the maximum singular value of a matrix. For example, spectral norm $|A|$ corresponds to the largest singular value of A.

In one embodiment, generating engine 201 obtains an upper bound on how much the error channel contributes to the bias (average error) of the result based on the quantity (based on the computed spectral norm of the commutator of the time-evolved error with the observable). That is, such a quantity provides a point in the "shaded light cone."

In connection with computing the values of region 405, in one embodiment, since each error channel and each gate act on only a few qubits, generating engine 201 computes how this error evolves forward through a nonzero number of gate layers in the quantum circuit. Such a computation is inexpensive for errors occurring near the end of the quantum circuit, but exponentially expensive for errors occurring earlier in the quantum circuit. As a result, in one embodiment, generating engine 201 performs the computation for errors near the end of the quantum circuit, working backwards until the computation exceeds a user-defined difficulty threshold (maximum time or maximum memory required).

In connection with computing the values of region 403, in one embodiment, additional light cone shading can be performed for errors occurring near the beginning of the quantum circuit. These errors can be evolved backwards to the beginning of the quantum circuit. In one embodiment, the Schatten L1 norm of the commutator of the backwards-evolved error with the initial state of the qubits ($\rho$) provides an upper bound on how much that error channel contributes to the bias (average error) of the result, i.e., another point in the shaded light cone. The Schatten L1 norm $|A|_1$ corresponds to the sum of the singular values of A.

In one embodiment, generating engine 201 evolves the error backwards in time and computes the Schatten L1 norm of that evolved error with the initial density matrix (initial state). Such a computation provides another bound on the bias due to the error.

In one embodiment, generating engine 201 computes how errors occurring near the beginning of the quantum circuit evolve backwards thereby shading in more points in the light cone until the computation difficulty exceeds a user-selected threshold.

In one embodiment, points in the shaded light cone (e.g., shaded light cone 400) are established based on the computations discussed above (computing time-evolved commutators of local errors and an observable on a portion of the quantum circuit). In one embodiment, such points are established in response to identifying values of the computations that exceed or less than a user-designated threshold value.

As discussed above, generating engine 201 generates a map of root errors (i.e., a map of the effects of quantum circuit errors to inform which errors are to be mitigated) by computing time-evolved commutators of local errors (e.g., Pauli errors) and an observable on a first portion of the quantum circuit (e.g., quantum circuit 109) as well as evolving the local weights through a second portion of the quantum circuit (e.g., quantum circuit 109). In one embodiment, generating engine 201 evolves the local weights (e.g., Pauli weights) through a second portion of the quantum circuit, such as starting from the location in the quantum circuit corresponding to the completion of the computation of the spectral norm of the commutator of a time-evolved error with the observable for each error channel in the quantum circuit.

In connection with computing values of region 404, in one embodiment, such an evolution of the local weights (e.g., Pauli weights) through a second portion of the quantum circuit is accomplished by generating engine 201 evolving the observable (e.g., energy) backwards. Generating engine 201 may then compute the backward-evolving observable using the upper bounds on its X, Y, and Z components on each qubit at each layer.

In one embodiment, generating engine 201 performs a fast computation that extends the results to shade more of the light cone in addition to the points in the shaded light cone identified by computing the time-evolved commutators of local errors and an observable as discussed above. In one embodiment, such a fast computation involves evolving the observable backwards rather than evolving the error for-wards. Also, generating engine 201 upper bounds the back-ward-evolving observable's X, Y, Z components on each qubit at each layer.

In one embodiment, at a given layer, there are a list of numbers (e.g., three) for each qubit with the values between 0 and 1. Each number is an upper bound on either the X, Y, or Z components of the backward-evolving observable on a qubit at the layer. These upper bounds are in turn upper bounds on the spectral norms of the commutator between the corresponding X, Y, or Z errors and the backward-evolving observable.

In one embodiment, the list of upper bounds at layer k is computed recursively backwards by generating engine 201 from the end of the quantum circuit, using the upper bounds at layer k+1. The starting point of this recursion is a layer where the backward-evolving observable can be computed exactly. Since each layer may involve only one- and two-qubit gates, generating engine 201 computes the upper bounds for each qubit at layer k from the upper bounds for at most 2 qubits from layer k+1, making the computation of the bounds efficient.

Furthermore, FIG. 4 illustrates the filling of the shaded light cone by time-evolved commutators. Additionally, FIG. 4 illustrates the further filling of the shaded light cone by evolving local weights in accordance with an embodiment of the present disclosure.

As illustrated in FIG. 4, shaded light cone 400 (map of root errors, i.e., map of the effects of quantum circuit errors to indicate which errors are to be mitigated) illustrates the error sites 401 for the various layers 402 by computing time-evolved commutators of local errors and an observable. Such a shaded light cone 400 may be further filled by evolving local weights as discussed above.

In one embodiment, generating engine 201 evolves the local weights through a second portion of the quantum circuit (e.g., quantum circuit 109) recursively as discussed above in connection with region 404 of FIG. 4.

At a given layer, an evolved operator can be written as a sum of Pauli operators:

$$O = \sum_{s_1}\sum_{s_2} \cdots \sum_{s_n} c_{s_1,s_2,\dots,s_n}\sigma_{s_1} \otimes \sigma_{s_2} \otimes \cdots \otimes \sigma_{s_n}$$

For example:

$$O = c_{x,x,y}XXY + c_{y,x,z}YXZ + c_{zyz}ZYZ + \dots$$

At a given layer, the local weights are defined as $$f_j^\mu = \sum_{s_1}\sum_{s_2} \cdots \sum_{s_{j-1}}\sum_{s_{j+1}} \cdots \sum_{s_n}|c_{s_1 s_2,\dots,s_{j-1},\mu,s_{j+1},s_n}|$$

which equals the total weights of Pauli strings that have $\sigma_\mu$ on site j. For example:

$$f_2^x = |c_{x,x,y}| + |c_{y,x,z}| + \dots$$

Given the upper bounds $$f_j^\mu \le w_j^\mu$$

on $$f_j^\mu$$

of O, which is the observable evolved to the layer of the error, the upper bound on the commutator using $$w_j^\mu$$

is the following:

$$\|[O, X_2]\| \le 2(f_2^y + f_2^z) \le 2(w_2^y + w_2^z)$$

where $$w_j^\mu$$

corresponds to the weights of the Pauli strings that have $\sigma_\mu$ on site j.

In one embodiment, the local weights of O are evolved by a Pauli transfer matrix W for qubit 1 and 2. Hence, the upper bounds may then be computed recursively as follows:

$$\tilde{f}_1^\mu \le \sum_v \sum_{\mu',v'} |W_{\mu',v',\mu v}| \min\left\{w_1^{\mu'}, w_2^{v'}\right\}$$

which is equal to $\tilde{w}_1$.

In step 602, prioritization engine 202 of classical computer 102 applies a prioritization scheme after using the generated map of the effects of quantum circuit errors to tighten an upper bound on a systematic error of a compu-tation of a quantum error mitigation technique (e.g., proba-bilistic error correction technique) to reduce an error rate of the state of at least one target qubit. That is, prioritization engine 202 of classical computer 102 applies a prioritization scheme after using the generated map of the effects of quantum circuit errors to tighten an upper bound to reduce an error rate of the state of at least one target qubit. Tightening an upper bound on a quantity, as used herein, refers to not having a smaller value be the upper bound. That is, by tightening an upper bound on a quantity, a claim that an existing guarantee that the quantity is less than a value is taken and strengthened by guaranteeing that the quantity is less than a smaller value. By tightening the upper bound, stronger accuracy guarantees are achieved while simultane-ously lowering sampling cost. That is, by tightening the upper bound, errors that do not affect the outcome of the result of the quantum circuit will be identified as corre-sponding to errors that should be ignored thereby reducing the sampling cost since such errors do not have to be cancelled which involves multiple runs of the quantum circuit.

As stated above, for example, in one embodiment, prioritization engine 202 prioritizes error channels defined by a noise model using the upper bound. In one embodiment, such a noise model corresponds to the Pauli-Lindblad noise model, where the probability of an error $p_i$ can be defined in terms of an error rate $\lambda_i$ as $$p_i = \frac{1}{2}\left(1 - e^{-2\lambda_i}\right).$$

In one embodiment, for each error channel $\Lambda_i$ the shaded light cone is a commutator bound $C_{E_i}$ which may be $|[E_i, A]|$, $|[E_i, \rho]|_1$, or the result of the computation for evolving local weights through a second portion of the quantum circuit as discussed above.

In one embodiment, the rates $$\lambda_i^*$$

at which the quantum error mitigation technique (e.g., PEC technique) applies "antinoise" is selected to cancel the error channels $\Lambda_i$. That is, prioritization engine 202 selects how much antinoise to apply.

The commutator norms provide an upper bound on the bias:

$$\varepsilon \le \sum_i \frac{1 - \exp(-2(\lambda_i - \lambda_i^*))}{2} C_{E_i}$$

As a result, prioritization engine 202 can select $$\lambda_i^*$$

to minimize this worst-case bias within the sampling budget constraint which can be quantified by $$\sum_i \lambda_i^*$$

The "sampling budget constraint," as used herein, refers to the length of time the quantum computation is allowed to run. That is, the "sampling budget constraint" indicates how many times the quantum circuit can be run or its modifications.

In one embodiment, the minimization of the worst-case bias is achieved by sorting the error channels by their "priority" $e^{-2\lambda_i} C_{E_i}$.

In step 603, mitigation engine 203 of classical computer applies anti-noise to mitigate the error channels in order of priority.

For example, mitigation engine 203 mitigates each error channel $$(\lambda_i^* = \lambda_i)$$

from high priority to low priority until either all the errors are mitigated or the sampling budget is exhausted.

Other prioritization strategies based on the shaded light cone discussed herein may be possible to minimize the typical bias rather than the worst-case bias.

Upon applying anti-noise to mitigate the error channels in order of priority, in one embodiment, mitigation engine 203 performs the quantum error mitigation technique on selected qubits, where such qubits are selected based on the map ("shaded light cone"), such as those associated with a likelihood that an error impacts the state of the qubit that exceeds a threshold value, which may be user-designated. In this manner, the quantum error mitigation technique is more effectively utilized.

A discussion regarding computing the values in the regions (e.g., regions 403, 404, 405) in the shaded light cone (e.g., shaded light cone 400) is provided below in connection with FIGS. 7-9.

FIG. 7 is a flowchart of a method 700 for computing the values in a first region, such as region 403, of the shaded light cone (e.g., shaded light cone 400) in accordance with an embodiment of the present disclosure.

Referring to FIG. 7, in conjunction with FIGS. 1-6, in step 701, generating engine 201 of classical computer 102 evolves the error backwards, which is stored, such as in the storage device (e.g., storage device 511, 515) of classical computer 102.

In step 702, generating engine 201 of classical computer 102 computes the L1 Schatten norm of the commutator of the evolved error with the initial state assuming that the error has not become too expensive to store.

As discussed above, in connection with computing the values of region 403, in one embodiment, additional light cone shading can be performed for errors occurring near the beginning of the quantum circuit. These errors can be evolved backwards to the beginning of the quantum circuit. In one embodiment, the Schatten L1 norm of the commutator of the backwards-evolved error with the initial state of the qubits ($\rho$) provides an upper bound on how much that error channel contributes to the bias (average error) of the result, i.e., another point in the shaded light cone. The Schatten L1 norm $|A|_1$ corresponds to the sum of the singular values of A.

In one embodiment, generating engine 201 evolves the error backwards in time and computes the Schatten L1 norm of that evolved error with the initial density matrix (initial state). Such a computation provides another bound on the bias due to the error.

In one embodiment, generating engine 201 computes how errors occurring near the beginning of the quantum circuit evolve backwards thereby shading in more points in the light cone until the computation difficulty exceeds a user-selected threshold.

FIG. 8 is a flowchart of a method 800 for computing the values in a second region (e.g., region 405) of the shaded light cone (e.g., shaded light cone 400) in accordance with an embodiment of the present disclosure.

Referring to FIG. 8, in conjunction with FIGS. 1-6, in step 801, generating engine 201 identifies an intermediate point between the observable and the error to minimize the computation cost.

In step 802, generating engine 201 evolves the error forwards to the intermediate point.

In step 803, generating engine 201 evolves the observable backwards to the intermediate point.

In step 804, generating engine 201 computes the spectral norm of the commutation of the evolved observable and the evolved error if the computation is not too expensive.

As discussed above, in connection with computing the values of region 405, in one embodiment, since each error channel and each gate act on only a few qubits, generating engine 201 computes how this error evolves forward through a nonzero number of gate layers in the quantum circuit. Such a computation is inexpensive for errors occurring near the end of the quantum circuit, but exponentially expensive for errors occurring earlier in the quantum circuit. As a result, in one embodiment, generating engine 201 performs the computation for errors near the end of the quantum circuit, working backwards until the computation exceeds a user-defined difficulty threshold (maximum time or maximum memory required).

FIG. 9 is a flowchart of a method 900 for computing the values in a third region, region 404, of the shaded light cone (e.g., shaded light cone 400) in accordance with an embodiment of the present disclosure.

Referring to FIG. 9, in conjunction with FIGS. 1-6, in step 901, generating engine 201 obtains the bounds on the local weights of the observable. In one embodiment, such bounds are obtained from the computed spectral norm of method 800 (see step 804).

In step 902, generating engine 201 evolves the bounds of the local weights backwards.

In step 903, generating engine 201 computes the bound on the spectral norm of the commutator of the evolved observable (e.g., observable evolved backwards) and the evolved error using the evolved local weights.

As discussed above, in one embodiment, generating engine 201 evolves the local weights (e.g., Pauli weights) through a portion of the quantum circuit, such as starting from the location in the quantum circuit corresponding to the completion of the computation of the spectral norm of the commutator of a time-evolved error with the observable for each error channel in the quantum circuit. The bound on the spectral norm of the commutator of the evolved observable (e.g., observable evolved backwards as discussed in FIG. 8) and the evolved error (e.g., evolved error as discussed in FIG. 8) is computed using the evolved local weights.

As a result of the foregoing, the sampling cost of quantum error mitigation techniques, such as probabilistic error cancellation, is reduced by generating a "shaded light cone" which indicates which errors are to be mitigated thereby informing the quantum error mitigation technique as to which errors can be ignored instead of cancelled thereby reducing the sampling cost of computations. As a result, there is a reduction in overall execution time for quantum error mitigation techniques, such as the probabilistic error cancellation technique, thereby enabling such techniques to be applied for a wider range of quantum computations, including larger calculations.

Furthermore, the principles of the present disclosure improve the technology or technical field involving quantum error mitigation.

As discussed above, quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty measurement outcomes. Techniques, such as quantum error mitigation techniques, have been developed to reduce (mitigate) the errors that occur in quantum computing algorithms. Such techniques involve running additional modified target circuits (target circuit is the quantum circuit executed on the quantum computer implementing the desired quantum algorithm). As a result, the use of quantum error mitigation techniques generally results in longer execution times. That is, such quantum error mitigation methods reduce the effect of hardware errors at a "sampling cost," where the "sampling cost" refers to running the quantum circuit multiple times. An example of a quantum error mitigation technique is the probabilistic error cancellation technique. Probabilistic error cancellation (PEC) is an error-mitigation technique that obtains accurate, bias-free estimates of observable expectation values. An observable refers to a property of the system that can be measured, such as position, momentum, angular momentum, energy, a binary value of a qubit, etc. An expectation value refers to the statistical average over classical and quantum randomness. The PEC procedure learns the noise associated with ideal unitary gates and implements a noise inversion ("antinoise") to cancel the noise via probabilistically sampling Pauli operators from an appropriately constructed inverse distribution and inserting them into a modified quantum circuit. The sampling cost from using PEC grows exponentially with the amount of noise that must be cancelled. As a result, for existing quantum hardware, the use of PEC is limited to relatively small computations. Other quantum error mitigation techniques exist with lower sampling costs; however, such techniques tend to be less accurate than PEC. Unfortunately, there is not currently an effective means for reducing the sampling cost of PEC while maintaining rigorous accuracy bounds so that PEC can be applied to a wider range of quantum computations, including larger computations.

Embodiments of the present disclosure improve such technology by generating a map of root errors ("shaded light cone"), where each root error includes a likelihood an error impacts a state of at least one target qubit, by computing time-evolved commutators of local errors (e.g., Pauli errors) and an observable (e.g., energy) or an initial state on a portion of the quantum circuit. Commutators provide an indication of the extent to which an error impacts the observed outcome with respect to the observable (e.g., energy). An observable, as used herein, refers to the properties of the system that can be measured, such as position, momentum, angular momentum, energy, a binary value of a qubit, etc. A prioritization scheme is then applied after using the generated map of the effects of quantum circuit errors to tighten an upper bound on a systematic error of a computation of a quantum error mitigation technique (e.g., probabilistic error cancellation) to reduce an error rate of the state of at least one target qubit. For example, error channels defined by a noise model may be prioritized using the upper bound. Anti-noise may then be applied to mitigate the error channels in order of priority. For example, each error channel from high priority to low priority is mitigated until either all the errors are mitigated or the sampling budget is exhausted. The "sampling budget" (also referred to herein as the "sampling budget constraint"), as used herein, refers to the length of time the quantum computation is allowed to run or the maximum number of quantum circuits to be executed. In this manner, the sampling cost of quantum error mitigation techniques, such as probabilistic error cancellation, is reduced by generating a "shaded light cone" which indicates the impact of errors on the final observable, informing a prioritization scheme as to which errors are to be mitigated thereby informing the quantum error mitigation technique as to which errors can be ignored instead of cancelled thereby reducing the sampling cost of computations. As a result, there is a reduction in overall execution time for quantum error mitigation techniques, such as probabilistic error cancellation, thereby enabling such techniques to be applied for a wider range of quantum computations, including larger calculations. Furthermore, in this manner, there is an improvement in the technical field involving quantum error mitigation.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for reducing the sampling cost of quantum error mitigation, the method comprising:
  generating a map of root errors, where each of said root errors comprises a likelihood an error impacts a state of at least one target qubit; and
  applying a prioritization scheme after using said map to tighten an upper bound on a systematic error of a computation of a quantum error mitigation technique to reduce an error rate of said state of said at least one target qubit.

2. The method as recited in claim 1 further comprising:
  prioritizing error channels defined by a noise model using said upper bound; and
  applying anti-noise to mitigate said error channels in order of priority.

3. The method as recited in claim 1 further comprising:
  evolving an observable backwards; and
  evolving an error forwards.

4. The method as recited in claim 3 further comprising:
  computing a spectral norm of a commutator of said evolved observable and said evolved error.

5. The method as recited in claim 1 further comprising:
  evolving local weights backwards; and
  computing a bound on a spectral norm of a commutator of an evolved observable using said evolved local weights.

6. The method as recited in claim 1 further comprising:
  selecting which qubits to perform said quantum error mitigation technique based on said map.

7. The method as recited in claim 1, wherein said quantum error mitigation technique comprises probabilistic error cancellation.

8. A computer program product for reducing the sampling cost of quantum error mitigation, the computer program product comprising one or more computer readable storage mediums having program code embodied therewith, the program code comprising programming instructions for:
  generating a map of root errors, where each of said root errors comprises a likelihood an error impacts a state of at least one target qubit; and
  applying a prioritization scheme after using said map to tighten an upper bound on a systematic error of a computation of a quantum error mitigation technique to reduce an error rate of said state of said at least one target qubit.

9. The computer program product as recited in claim 8, wherein the program code further comprises the programming instructions for:
  prioritizing error channels defined by a noise model using said upper bound; and
  applying anti-noise to mitigate said error channels in order of priority.

10. The computer program product as recited in claim 8, wherein the program code further comprises the programming instructions for:
  evolving an observable backwards; and
  evolving an error forwards.

11. The computer program product as recited in claim 10, wherein the program code further comprises the programming instructions for:
  computing a spectral norm of a commutator of said evolved observable and said evolved error.

12. The computer program product as recited in claim 8, wherein the program code further comprises the programming instructions for:
  evolving local weights backwards; and
  computing a bound on a spectral norm of a commutator of an evolved observable using said evolved local weights.

13. The computer program product as recited in claim 8, wherein the program code further comprises the programming instructions for:
  selecting which qubits to perform said quantum error mitigation technique based on said map.

14. The computer program product as recited in claim 8, wherein said quantum error mitigation technique comprises probabilistic error cancellation.

15. A system, comprising:
  a memory for storing a computer program for reducing the sampling cost of quantum error mitigation; and
  a processor connected to said memory, wherein said processor is configured to execute program instructions of the computer program comprising:
    generating a map of root errors, where each of said root errors comprises a likelihood an error impacts a state of at least one target qubit; and
    applying a prioritization scheme after using said map to tighten an upper bound on a systematic error of a computation of a quantum error mitigation technique to reduce an error rate of said state of said at least one target qubit.

16. The system as recited in claim 15, wherein the program instructions of the computer program further comprise:
  prioritizing error channels defined by a noise model using said upper bound; and
  applying anti-noise to mitigate said error channels in order of priority.

17. The system as recited in claim 15, wherein the program instructions of the computer program further comprise:
  evolving an observable backwards; and
  evolving an error forwards.

18. The system as recited in claim 17, wherein the program instructions of the computer program further comprise:
  computing a spectral norm of a commutator of said evolved observable and said evolved error.

19. The system as recited in claim 15, wherein the program instructions of the computer program further comprise:

evolving local weights backwards; and computing a bound on a spectral norm of a commutator of an evolved observable using said evolved local weights.

20. The system as recited in claim 15, wherein the program instructions of the computer program further comprise:

selecting which qubits to perform said quantum error mitigation technique based on said map.

* * * * *